United States Patent [19]

Dubost et al.

[11] Patent Number: 5,511,004
[45] Date of Patent: Apr. 23, 1996

[54] DIAGNOSTIC METHOD FOR AN EVOLUTIONARY PROCESS

[75] Inventors: Laurent Dubost, Paris; Jean-Noël Heude, Argenteuil, both of France

[73] Assignee: Thomson-CSF, Paris, France

[21] Appl. No.: 182,153

[22] PCT Filed: Jun. 2, 1993

[86] PCT No.: PCT/FR93/00527

§ 371 Date: Feb. 1, 1994

§ 102(e) Date: Feb. 1, 1994

[87] PCT Pub. No.: WO93/24808

PCT Pub. Date: Dec. 9, 1993

[30] Foreign Application Priority Data

Jun. 3, 1992 [FR] France ................................. 92 06708

[51] Int. Cl.⁶ ............................. G01D 1/14; G05B 23/02
[52] U.S. Cl. ....................... 364/551.01; 395/904; 395/912
[58] Field of Search ........................ 364/551.01, 551.02, 364/550, 468, 469, 474.16, 581, 578; 395/924.4, 904, 912, 3, 50–51, 61, 906, 914

[56] References Cited

U.S. PATENT DOCUMENTS

| | | | |
|---|---|---|---|
| 4,644,479 | 2/1987 | Kemper et al. | 364/550 |
| 5,009,833 | 4/1991 | Takeuchi et al. | 364/924.4 X |
| 5,070,468 | 12/1991 | Niinomi et al. | 364/550 |
| 5,089,978 | 2/1992 | Lipner et al. | 364/551.01 |
| 5,099,436 | 3/1992 | McCown et al. | 364/550 |
| 5,132,920 | 7/1992 | Bellows et al. | 364/551.01 |
| 5,210,704 | 5/1993 | Husseiny | 364/551.01 |
| 5,285,376 | 2/1994 | Struger et al. | 364/147 |
| 5,351,200 | 9/1994 | Impink, Jr. | 364/550 |
| 5,357,449 | 10/1994 | Oh | 364/551.01 |

Primary Examiner—Emanuel T. Voeltz
Assistant Examiner—Melanie Kemper
Attorney, Agent, or Firm—Oblon, Spivak, McClelland, Maier & Neustadt

[57] ABSTRACT

The method of the invention establishes a reference state and a current state for an industrial evolutionary process from physical parameters measured on all the equipment items employing the evaluating process. These two states are compared, parameter by parameter, by resorting to fuzzy logic for classifying the quantities, and a diagnosis is established using expert rules.

11 Claims, 3 Drawing Sheets

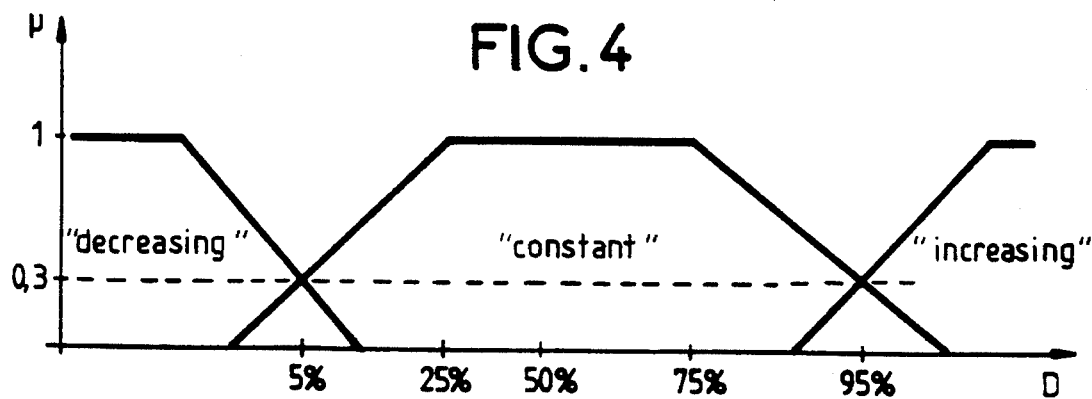
FIG. 4
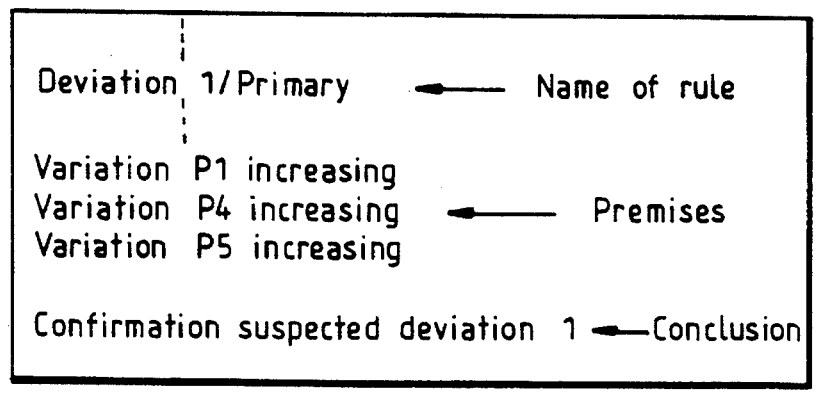
FIG. 5
FIG. 6

5,511,004

DIAGNOSTIC METHOD FOR AN EVOLUTIONARY PROCESS

BACKGROUND OF THE INVENTION

1. Field of the Invention

The present invention relates to a diagnostic method for an evolutionary process.

2. Discussion of the Background

The cost of maintenance operations carried on complex industrial equipment is often considered by the users to be too high. This is why the manufacturers of such equipment rely increasingly on methods capable of spacing out or even eliminating some scheduled maintenance operations without increasing the frequency of unpredictable breakdowns.

For this, a better knowledge of a certain number of operational processes is necessary. The evolution of the equipment must be ascertained; the state of advance of possible damage must be known.

Systems developed hitherto tend to be deterministic; they are based on the following reasoning:

if all the symptoms of the anomaly x are present, then the anomaly x is present.

This approach is not in general satisfactory, because there are uncertainties linked with the physical measurements which make it possible to define the current state of the equipment; in practice, it almost always arises that one or other of the symptoms predicted are not present, whereas the anomaly is actually present.

SUMMARY OF THE INVENTION

The subject of the present invention is a diagnostic method for an evolutionary process, such as an industrial manufacturing process, or the operation of equipment, which makes it possible, in real time, to optimize the maintenance operations, to recognize anomalous situations and to determine their causes as reliably as possible, to remedy these anomalies as quickly as possible, and to predict as quickly and reliably as possible possible degradations in characteristics of the equipment used which can lead to future breakdowns, as well as to anticipate the evolution of an operation for given environmental and control data.

The diagnostic method according to the invention comprises the following steps: measuring physical quantities relating to the process, determining the current state from these quantities, determining, from these same quantities, a reference state, comparing, quantity by quantity, these two states, these quantities being weighted as a function of their importance for the evolution of the process.

BRIEF DESCRIPTION OF THE DRAWINGS

The present invention will be better understood on reading the detailed description of one embodiment, taken by way of a non-limiting example and illustrated by the attached drawings, in which:

FIGS. 3 and 4 are diagrams of domains to which each parameter used by the method of the invention may belong;

FIG. 5 is a table explaining the possibilities of deviations of parameters with respect to nominal states, which table can be used by the method of the invention;

FIG. 6 is a table showing an example of a diagnostic ruler according to the present invention.

DESCRIPTION OF PREFERRED EMBODIMENTS

The invention is described hereinbelow with reference to a real-time diagnostic method for equipment in operation, such as a seawater desalination plant, but it is clear that it may be applied to any evolutionary process, for example equipment, a machine, or a set of machines in operation, whatever the nature of these machines (mechanical and/or electrical and/or chemical and/or electronic), their mode of operation (continuous or intermittent), their use (manufacture of products, production of energy, conversion, etc.) and their degree of complexity. Obviously, the invention is of particular interest for control and monitoring of equipment including numerous elements whose wear and whose operating conditions can give rise to breakdowns which are difficult to predict with known methods and/or in which the causes of the breakdowns are difficult to detect or to predict with known methods.

The method of the invention is termed a diagnostic method. This term concerns not only the diagnosis, but it also concerns the monitoring of a process, determining the best conditions (or the optimal conditions) for running of this process, for example with a view to optimizing maintenance operations, detecting tell-tale signs of potential breakdowns, predicting with high precision the moment when a breakdown risks occurs, and minimizing the risks of occurrence of breakdowns.

Figure 1:
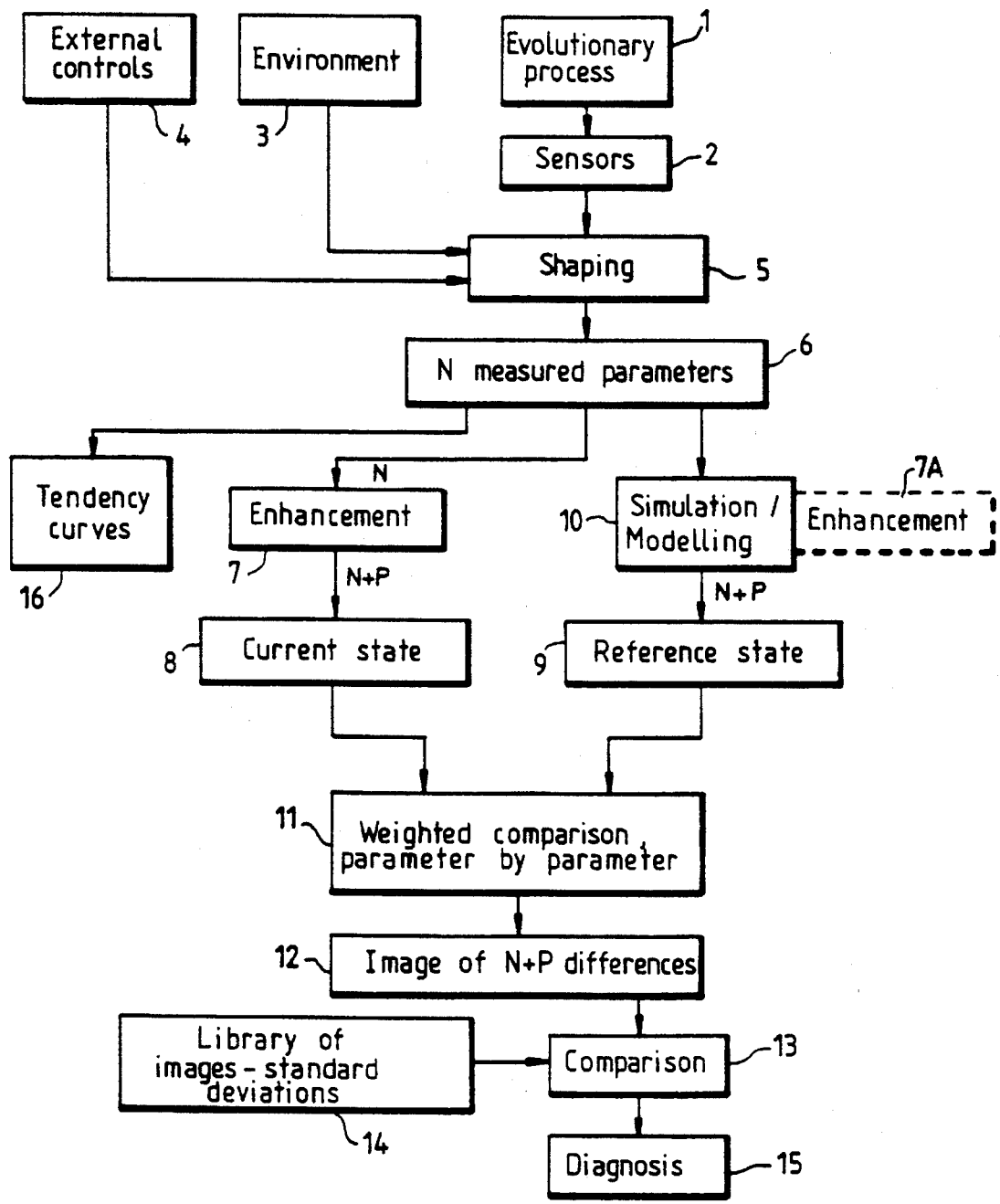
FIG. 1 is a diagram of the method according to the invention.

In the diagram in FIG. 1, 1 represents equipment in operation, which is therefore the seat of an evolutionary process. A set 2 of sensors is combined with the equipment 1. The sensors of the set 2 detect all the physical quantities (or parameters) necessary for diagnosing the state of the equipment 1 and determining the evolution thereof.

It is also possible to provide sensors 3 for the environment, for example for atmospheric pressure, external temeprature, etc. Sensors are associated with external controls 4 operated by an operator, for example controls of fluid flow rate, charge current, speed of motors, etc.

The information provided by all these sensors is, if appropriate, shaped at 5: they are for example digitized (if they are supplied in analog form), or brought to one and the same voltage level. This shaping 5 may also include a calculation of parameters not directly supplied, for example the calculation of an output voltage of an equipment item, knowing its input voltage and its gain.

After shaping 5, all the parameters necessary for diagnosis of the equipment 1 are available at 6. From these parameters 6, a current state 8 of the equipment 1 is, on the one hand, established after an enhancement phase 7. The enhancement phase 7, which is not necessary in all cases, consists in calculating certain quantities which are not directly measurable, for example an efficiency, an equivalent section, a head loss, etc., it being possible for these quantities to be calculated from the parameters measured at 6.

On the other hand, from the parameters measured at 6, a "reference state" 9 is determined in real time. This reference state is the image of the ideal or nominal state which the equipment 1 should have (to which the current state 8 should be equal), under the same operational conditions (inparticular under the same environmental conditions 3 and with the same external controls 4) if all the elements making up this equipment were operating optimally with nominal characteristics. Clearly, if step 7 exists for determining state 8, it is necessary to provide a similar step 7A for determining state 9.

This reference state 9 may be obtained either directly from the parameters measured at 6, or be produced by simulation (10) from the parameters measured at 6. This simulation use, in a manner known per se, a mathematical model of the equipment 1 whose input quantities are the parameters measured at 6, or a subset of these parameters, and the output quantities are those defining the reference state 9. According to a variant of the invention, the reference state 9 may be determined from fixed data stored in tables. The simulation 10 includes, if appropriate, the enhancement stage 7A.

According to a variant of the invention, the reference state may be obtained by learning. The reference state may either be stationary or evolutionary (for example as a function of new operational conditions imposed on the equipment).

The frequency of acquisition of the quantities (2, 3 and 4) relating to the process of which the equipment 1 is the seat, is determined by the speed of evolution of this process and by the speed with which breakdowns may be produced.

If this process has slow evolution (for example a chemical treatment of long duration) and if operational anomalies of the elements of the equipment can produce breakdowns only very slowly, this frequency may, for example, be of the order of several minutes or several tens of minutes. On the other hand, in the case of a rapid process (for example in equipment including rotating or vibrating machines, rapidly acting devices for treatment or machining of materials, such as machine tools or surface treatment apparatuses, in particular those which must operate with high precision), the frequency of acquisition of the measurements by the sensors 2 may, for example, be of the order of one second, and the current state and the reference state must themselves also be determined rapidly, for example every minute.

From the two states 8 and 9, a comparison, parameter by parameter (step 11), is carried out by taking into account deviations, that is to say catalogued anomalous situations (states capable of evolving into a breakdown or a harmful incident). These parameters are assigned weights which are a function, for example, of the number of corresponding premises.

With a view to carrying out this "complex" comparison, the techniques of artificial intelligence and of fuzzy logic are resorted to.

Figure 2:
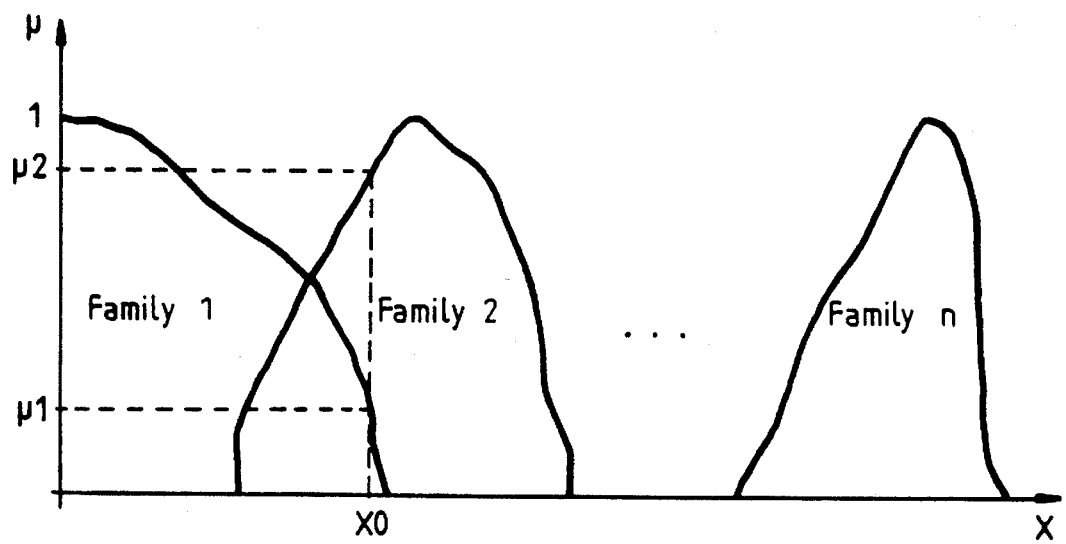
FIG. 2 is a diagram explaining the calculation, according to fuzzy logic, of the likelihood coefficients for determining the membership of a parameter to a family of parameters.

Thus, a parameter X may belong to two or more families of parameters. If this parameter X has the value XO (FIG. 2), it has, according to the principle of fuzzy logic, a likelihood coefficient $\mu 1$ with respect to the family 1 and a likelihood coefficient $\mu 2$ with respect to the family 2, these two families having some degree of overlap. In the case of the invention, a threshold is associated with each parameter, which determines the domains in which this parameter lies. For example, three domains are delimited: a so-called "constant" domain centered on the reference value of this parameter, in which the parameter is considered not to vary (to take into account imprecisions in the measurements and because, as long as the parameter does not leave this domain, it is considered to lead to no detrimental effect on the equipment itself or, if appropriate, on the products manufactured by the equipment). Another domain, termed "decreasing", is that in which it is considered that the parameter is decreasing or is less than its reference value. The third domain, termed "increasing", is that in which the parameter is increasing or is greater than its nominal value. Clearly, the invention is not limited to these three domains: a larger number of domains thereof may be determined.

Figure 3:
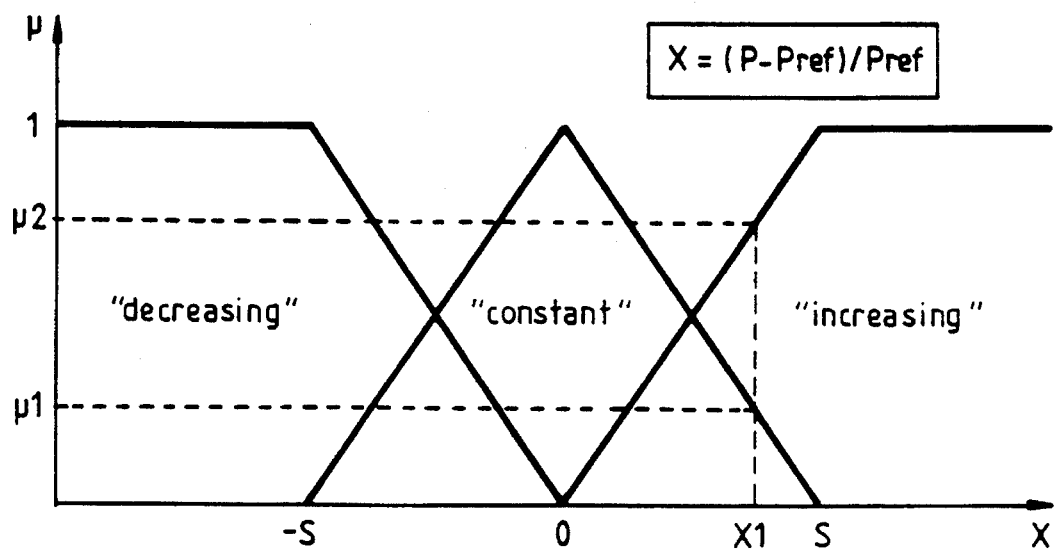

The three domains defined hereinabove have been diagrammatically represented on the diagram in FIG. 3. The values of relative differences $X=(P-Pref)P$ ref (P=current value of the parameter and Pref= reference value of this parameter) are plotted on the abscissa axis of this diagram, and its ordinate axis is graduated in values of $\mu$ (likelihood coefficients associated with each of these domains, similar to that defined with reference to FIG. 2). The values $-S$ and $+S$ delimiting the "constant" domain have been marked on the abscissa axis. If, as indicated in FIG. 3, X has the value X1, the parameter P belongs to two domains, but has a coefficient $\mu 1$ of membership of the "constant" domain and a coefficient $\mu 2$ of membership of the "increasing" domain. The thresholds $-S$ and $+S$ are a function of the measuring precision of the sensors used, and they may be relative, or absolute if the reference is zero.

In practice, it is possible, for example, (FIG. 4) to adjust these thresholds from a statistical analysis of a set of readings corresponding to the reference states, that is to say in the absence of anomalies. The distribution D of the relative differences of each parameter with respect to the reference values coming from the modelling is then studied. The standard deviation, the mean, the minimum and maximum values and the various quantiles are then determined. It is then possible to determine the membership functions of the parameters to the aforementioned domains using the distributions obtained. For this purpose, it is possible, for example, to position the thresholds such that at least 50% of the values read belong to the "constant" domain with $\mu$ equal to 1, and that less than 10% of the values read belong to the "increasing" or "decreasing" domains with $\mu$ greater than 0.3. In FIGS. 3 and 4, the boundaries of these domains are straight-line segments, but it is obvious that, in reality, these boundaries are curves. This determination of the relative differences is denoted 12 in FIG. 1.

In order to be able to make a comparison between the parameters of the current state of an equipment item and those of a reference state, it is necessary to be able to classify the parameters of the current state into several categories. Each parameter is characteristic, to a greater or lesser extent, of a given symptom.

According to the example in FIG. 5, four categories of parameters are determined: primary, secondary, tertiary and ordinary. A state evolving into a breakdown or an incident is here called a "deviation", and the increasing, constant and decreasing domains are respectively labelled by arrows pointing upwards, horizontally and downwards.

A parameter is termed primary when its difference with respect to its reference value is directly indicative of the deviation in question, physically signifying the deviation;

it is termed secondary when its difference physically indicates the deviation, but is less directly linked thereto;

it is termed tertiary when its difference is due to the propagation of the direct effects of the deviation; and it is termed ordinary if the deviation has no influence on it or if its difference is not observable or measurable.

From these definitions, each deviation is characterized by a qualitative state in a table such as that in FIG. 5. This table includes one column per deviation and one line per parameter. In each case of this table, the domain (such as determined from FIG. 3 or 4) and the category of the catalogue parameter (primary, secondary, tertiary or ordinary) are indicated. Obviously, this example is not limiting, and it is possible to provide other categories, and their may be a different number of them.

The diagnosis is made by comparison (13 in FIG. 1) of the current state of the equipment 1 with the qualitative states relating to each of the deviations catalogued in the table in FIG. 5. An expert diagnostic rule is associated with each group of symptoms. The diagnosis is obtained by application, for each deviation, of three rules for the example described here (for N deviations, 3N rules are applied, namely one rule for each of the three significant parameters: primary, secondary and tertiary).

A rule is defined by premises and a conclusion. Thus, for example, in FIG. 6, the rule relating to deviation 1 in FIG. 5 is represented for primary parameters (rule name=primary deviation 1). The premises drawn from the first column of the table in FIG. 5 therefore concern the parameters 1, 4 and 5, which are respectively increasing, increasing and decreasing. It could be concluded therefrom that if the current state satisfies these three premises, the existence of deviation 1 is confirmed. These rules can be easily modified (it is sufficient to modify the list of the premises), in order to take into account, for example, an equipment modification or a better definition of the deviations.

However, the behavior of an equipment item is not strictly predictable in its smallest details and in all the combinations of symptoms, for various reasons, such as: difficulty of modelling, uncontrolled environment, breakdown of sensor, unpredicted deviation, etc.

In consequence, the application of a rule in the following manner: "if all the premises concerning the deviation X are present with a membership coefficient of 1, then the deviation X is diagnosed" would not be accepable, because it would not make it possible to identify the deviations for which, for example, 90% of the premises are satisfied.

According to the invention, no threshold is imposed on the membership coefficients for accepting a rule. All the diagnostic rules are therefore acceptable and accepted, and all the possible conclusions are therefore obtained.

The elementary categories of the parameters (primary, secondary, tertiary) are evaluated as being the mean of the membership coefficients ($\mu$) of each of the premises of each rule.

For each deviation, the global evaluation is obtained by calculating the weighted mean of the aforementioned elementary categories. The highest weight is assigned to the primary category, a smaller weight to the secondary category, and an even smaller weight to the third category. It is thus possible to classify the various deviations (14 in FIG. 1). The conclusion may be drawn, for example, by estimating that, if the value of the category in question exceeds a given threshold, the corresponding deviation actually exists (step 15 in FIG. 1).

A severity index of the deviation can be fixed, for example, by calculating a weighted mean of the ratios X/threshold (with X={P−Pref}/Pref, as already specified). The weighting is also made as indicated hereinabove, but by also taking into account the fact that the variation (increasing, constant or decreasing) may or may not be in the direction expected from the characterization of this deviation.

Clearly, if it is desired to determine the manner in which a diagnosis has been established by a computer, it is possible to access the various parameters and the process followed by the computer for establishing the diagnosis.

When the equipment 1 is in operation, the values taken by the parameters are recorded. The processing of the log of these values can give an indication of their foreseeable evolutions for given environmental conditions and for given external controls, and the delay before exceeding a threshold judged critical. Clearly, the measurement of the parameters can be made at a very high rate if these parameters are capable of varying rapidly, but their recording can be made at only relatively long intervals, when they vary significantly, in order not to have to store an excessively large number of values. The processing of the log of the stored values of the various parameters may, for example, consist in approximating their evolutions using functions, it being possible for these functions to be, for example, polynomials, exponentials, etc., which are known per se. The tendency curves thus obtained can be displayed on a screen and/or be printed. The extrapolation making it possible to make predictions can be obtained (step 16 in FIG. 1) by linear regression on the last operational time lapse. Using these tendency curves and their extrapolation, it is possible, for example, to determine the time for which the equipment can still operate without risk of breakdown, and to improve the use of the equipment and optimize its maintenance.

We claim:

1. A diagnostic method for determining deviations of an evolutionary process, comprising the steps of:

measuring a plurality of physical parameters characteristic of the evolutionary process;

calculating from the measured plurality of physical parameters a current state of the evolutionary process and a corresponding reference state of the evolutionary process;

first comparing the current state and the reference state physical parameter by physical parameter to generate relative differences between the current state and reference state for each parameter;

categorizing each parameter into one of a plurality of categories indicating a relevance of each parameter to a respective deviation in the evolutionary process;

determining for each respective deviation the relative difference between the current state and the reference state parameter by parameter which generate the respective deviation; and diagnosing each respective deviation based on the category of each parameter and the parameter by parameter determined relative differences between the current state and the reference state which generate the respective deviation.

2. The method according to claim 1, wherein the reference state is obtained by modelling the measured physical parameters.

3. The method according to claim 1, wherein the reference state is obtained from stored values.

4. The method according to claim 1, wherein the reference state is obtained by learning.

5. The method according to any one of claims 2–4, wherein the reference state is evolutionary.

6. The method according to claim 1, wherein the current state is evaluated by classifying the measured physical parameters in domains defined with respect to reference values.

7. The method according to claim 6, wherein the domains are defined from values of corresponding physical parameters measured in an absence of anomalies and by statistically determining limits of the domains from a distribution of relative differences of magnitudes with respect to the reference values.

8. The method according to either of claims 6 or 7, wherein the step of diagnosing further comprises the step of establishing an expert rule with premises which each determine membership of a measured quantity to a domain defined with respect to the reference values of the measured physical parameter, by calculating a mean of member coefficients of each premise, by weighting the mean by a weighting function of the domain, and by comparing a result with a threshold value.

9. The method according to claim 1, wherein tendency curves are established from the measured physical parameters.

10. The method according to claim 1, wherein at least one of the plurality of physical parameters belongs to two or more families of parameters and has respective likelihood coefficients for each of the families of parameters.

11. The method according to claim 10, wherein the families of parameters have a degree of overlap.

* * * * *